(12) United States Patent
Martin

(10) Patent No.: US 8,967,147 B2
(45) Date of Patent: Mar. 3, 2015

(54) FILTERING FACE-PIECE RESPIRATOR HAVING AN AUXETIC MESH IN THE MASK BODY

(75) Inventor: Philip G. Martin, Forest Lake, MN (US)

(73) Assignee: 3M Innovative Properties Company, St. Paul, MN (US)

(\*) Notice: Subject to any disclaimer, the term of this patent is extended or adjusted under 35 U.S.C. 154(b) by 289 days.

(21) Appl. No.: 12/964,789

(22) Filed: Dec. 10, 2010

(65) Prior Publication Data

US 2011/0155137 A1     Jun. 30, 2011

Related U.S. Application Data

(60) Provisional application No. 61/291,052, filed on Dec. 30, 2009.

(51) Int. Cl.
| | | |
|---|---|---|
| *A62B 7/10* | (2006.01) | |
| *A62B 18/02* | (2006.01) | |
| *A62B 23/02* | (2006.01) | |
| *B29C 39/14* | (2006.01) | |
| *B29D 28/00* | (2006.01) | |
| *A41D 13/11* | (2006.01) | |
| *B29L 28/00* | (2006.01) | |
| *B29L 31/14* | (2006.01) | |
| *B29L 31/48* | (2006.01) | |

(52) U.S. Cl.
CPC ............. *A62B 18/025* (2013.01); *A62B 23/025* (2013.01); *B29C 39/148* (2013.01); *B29D 28/00* (2013.01); *A41D 13/1138* (2013.01); *A41D 13/1146* (2013.01); *B29L 2028/00* (2013.01); *B29L 2031/14* (2013.01); *B29L 2031/4835* (2013.01)
USPC ................................ 128/206.19; 128/205.29

(58) Field of Classification Search
USPC .............. 128/205.27, 205.29, 206.12–206.21
See application file for complete search history.

(56) References Cited

U.S. PATENT DOCUMENTS

| | | | |
|---|---|---|---|
| 4,004,584 A | 1/1977 | Geaney | |
| 4,187,390 A | 2/1980 | Gore | |
| 4,233,290 A | 11/1980 | Ferrari et al. | |

(Continued)

FOREIGN PATENT DOCUMENTS

| | | |
|---|---|---|
| CN | 2469936 | 1/2002 |
| EP | 0059049 B1 | 9/1982 |

(Continued)

OTHER PUBLICATIONS

International Application No. PCT/US2010/059792 Search Report for dated Aug. 25, 2011.

(Continued)

*Primary Examiner* — Rachel Young
(74) *Attorney, Agent, or Firm* — Karl G. Hanson

(57) ABSTRACT

A filtering face-piece respirator 10 that has a harness 14 and a mask body 12. The mask body 12 includes a support structure 16 and a filtering structure 18. The support structure 16 contains an auxetic mesh 20 that has been molded into an intended cup-shape configuration, and the filtering structure 18 contains a filtration layer 42 for removing contaminants from the ambient air. The use of an auxetic mesh 20 in the support structure 16 provides more uniformly-sized openings 26 in the mesh 20 and reduces opportunities for mesh overlapping and mesh distortion.

20 Claims, 6 Drawing Sheets

(56) References Cited

U.S. PATENT DOCUMENTS

| | | | |
|---|---|---|---|
| 4,319,567 A | 3/1982 | Magidson | |
| D267,985 S | 2/1983 | Huber | |
| 4,384,577 A | 5/1983 | Huber et al. | |
| 4,454,881 A | 6/1984 | Huber et al. | |
| D285,374 S | 8/1986 | Huber et al. | |
| 4,668,557 A | 5/1987 | Lakes | |
| 4,850,347 A | 7/1989 | Skov | |
| 4,860,737 A | 8/1989 | Lang et al. | |
| 4,873,972 A | 10/1989 | Magidson et al. | |
| 4,995,382 A | 2/1991 | Lang et al. | |
| 5,015,574 A | 5/1991 | Furutani et al. | |
| 5,035,713 A | 7/1991 | Friis | |
| 5,098,755 A | 3/1992 | Tanquary et al. | |
| 5,108,413 A | 4/1992 | Moyers | |
| 5,334,903 A | 8/1994 | Smith | |
| 5,352,508 A | 10/1994 | Cheong | |
| 5,547,302 A | 8/1996 | Dornbusch et al. | |
| 5,613,334 A | 3/1997 | Petrina | |
| 5,763,078 A * | 6/1998 | Braun et al. | 428/175 |
| 5,780,048 A | 7/1998 | Lee | |
| 6,098,201 A | 8/2000 | Boros, Sr. | |
| 6,117,518 A | 9/2000 | Cawse et al. | |
| 6,372,932 B1 | 4/2002 | Kepert et al. | |
| 6,403,197 B1 | 6/2002 | Skov et al. | |
| 6,412,593 B1 | 7/2002 | Jones | |
| 6,571,797 B1 | 6/2003 | Magidson et al. | |
| 6,878,320 B1 | 4/2005 | Alderson et al. | |
| 6,942,894 B2 | 9/2005 | Alberg et al. | |
| 8,021,628 B2 | 9/2011 | Feisel et al. | |
| 2001/0015205 A1 | 8/2001 | Bostock et al. | |
| 2002/0045041 A1 | 4/2002 | Dillon et al. | |
| 2003/0042176 A1 | 3/2003 | Alderson et al. | |
| 2003/0089437 A1 | 5/2003 | Poitras | |
| 2003/0124279 A1 | 7/2003 | Sridharan et al. | |
| 2003/0205231 A1 | 11/2003 | Shigematsu et al. | |
| 2003/0219866 A1 | 11/2003 | Kruijer | |
| 2004/0039453 A1 | 2/2004 | Anderson et al. | |
| 2004/0178544 A1 | 9/2004 | Jackson et al. | |
| 2004/0180186 A1 | 9/2004 | Jackson et al. | |
| 2004/0186588 A1 | 9/2004 | Sridharan et al. | |
| 2005/0142331 A1 | 6/2005 | Anderson et al. | |
| 2005/0159066 A1 | 7/2005 | Alderson et al. | |
| 2005/0287371 A1 | 12/2005 | Chaudhari et al. | |
| 2006/0129227 A1 | 6/2006 | Hengelmolen | |
| 2006/0180505 A1 | 8/2006 | Alderson et al. | |
| 2006/0202492 A1 | 9/2006 | Barvosa-Carter et al. | |
| 2007/0031667 A1 | 2/2007 | Hook et al. | |
| 2007/0286987 A1 * | 12/2007 | Anderson et al. | 428/152 |
| 2008/0035788 A1 | 2/2008 | Kothera et al. | |
| 2008/0145599 A1 | 6/2008 | Khan et al. | |
| 2008/0271739 A1 * | 11/2008 | Facer et al. | 128/206.19 |
| 2008/0290141 A1 | 11/2008 | Shaw et al. | |
| 2009/0044808 A1 * | 2/2009 | Guney et al. | 128/206.24 |
| 2009/0119820 A1 * | 5/2009 | Bentham et al. | 2/267 |
| 2010/0154798 A1 * | 6/2010 | Henry et al. | 128/206.24 |
| 2010/0159768 A1 * | 6/2010 | Lee et al. | 442/189 |
| 2010/0198177 A1 * | 8/2010 | Yahiaoui et al. | 604/359 |
| 2010/0252047 A1 * | 10/2010 | Kirk et al. | 128/206.19 |
| 2011/0214560 A1 * | 9/2011 | Skertchly | 89/36.02 |

FOREIGN PATENT DOCUMENTS

| | | |
|---|---|---|
| EP | 0097517 B1 | 1/1984 |
| EP | 0106439 B1 | 4/1984 |
| EP | 0106440 A1 | 4/1984 |
| EP | 0497607 A1 | 8/1992 |
| EP | 1120651 A1 | 8/2001 |
| EP | 0772410 B1 | 11/2004 |
| EP | 1165865 B1 | 7/2005 |
| JP | 6-137799 | 5/1994 |
| JP | 8-19634 | 1/1996 |
| JP | 9-37578 | 2/1997 |
| JP | 2008-206928 | 9/2008 |
| KR | 10-2007-0103457 | 10/2007 |
| WO | WO 91/01186 | 2/1991 |
| WO | WO 91/01210 | 2/1991 |
| WO | WO 96/03899 A1 | 2/1996 |
| WO | WO 97/09167 | 3/1997 |
| WO | WO 99/22838 | 5/1999 |
| WO | WO 99/25530 | 5/1999 |
| WO | WO 99/45407 | 9/1999 |
| WO | WO 00/53830 | 9/2000 |
| WO | WO 03/057769 A1 | 7/2003 |
| WO | WO 2004/012785 A1 | 2/2004 |
| WO | WO 2004/088015 A1 | 10/2004 |
| WO | WO 2005/065929 A1 | 7/2005 |
| WO | WO 2005/072649 A1 | 8/2005 |
| WO | WO 2006/021763 A1 | 3/2006 |
| WO | WO 2006/099975 A1 | 9/2006 |

OTHER PUBLICATIONS

Knansah, M.A., et al., *Modelling the Effects of Negative Poisson's Ratios In Continuous-Fibre Composites*, Journal of Materials Science, vol. 28, 1993, pp. 2687-2692.

Pickles, A.P., et al., *The Effects of Powder Morphology on The Processing of Auxetic Polypropylene (PP of Negative Poisson's Ratio)*, Polymer Engineering and Science, vol. 36, No. 5, Mid-Mar. 1996, pp. 636-642.

\* cited by examiner

FILTERING FACE-PIECE RESPIRATOR HAVING AN AUXETIC MESH IN THE MASK BODY

CROSS-REFERENCE TO RELATED APPLICATION

This application claims the benefit of U.S. Provisional Patent Application No. 61/291,052, filed Dec. 30, 2009.

The present invention pertains to a filtering face-piece respirator that has an auxetic mesh in the support structure of the mask body.

BACKGROUND

Respirators are commonly worn over the breathing passages of a person for at least one of two common purposes: (1) to prevent impurities or contaminants from entering the wearer's breathing track; and (2) to protect other persons or things from being exposed to pathogens and other contaminants exhaled by the wearer. In the first situation, the respirator is worn in an environment where the air contains particles that are harmful to the wearer, for example, in an auto body shop. In the second situation, the respirator is worn in an environment where there is risk of contamination to other persons or things, for example, in an operating room or clean room.

A variety of respirators have been designed to meet either (or both) of these purposes. Some of these respirators have been categorized as being "filtering face-pieces" because the mask body itself functions as the filtering mechanism. Unlike respirators that use rubber or elastomeric mask bodies in conjunction with attachable filter cartridges (see, e.g., U.S. Pat. RE39,493 to Yuschak et al.) or insert-molded filter elements (see, e.g., U.S. Pat. No. 4,790,306 to Braun), filtering face-piece respirators have the filter media cover much of the whole mask body so that there is no need for installing or replacing a filter cartridge. Conventional filtering face piece respirators have regularly comprised non-woven webs of thermally-bonding fibers to furnish the mask body with its intended cup-shaped configuration. These filtering face-piece respirators are relatively light in weight and easy to use. Examples of patents that disclose such filtering face-piece respirators include U.S. Pat. No. 7,131,442 to Kronzer et al, U.S. Pat. Nos. 6,923,182 and 6,041,782 to Angadjivand et al. U.S. Pat. Nos. 6,568,392 and 6,484,722 to Bostock et al., U.S. Pat. No. 6,394,090 to Chen, U.S. Pat. No. 4,807,619 to Dyrud et al., and U.S. Pat. No. 4,536,440 to Berg.

Conventional filtering face-piece respirators also have used an open-work plastic mesh structure to provide mask shape and support for the filter media. Examples of patents that describe plastic mesh-type support structures include U.S. Pat. No. 4,873,972 to Magidson et al., U.S. Pat. No. 4,850,347 to Skov, and Des. 285,374 to Huber et al. Commercially available respirators that use open-work plastic meshes as the support structure include, for example, the 2200-2500 Series and the EX-ON Series particulate respirators sold by Moldex-Metric Inc. of Culver City, Calif. The known mesh support structures for filtering face-piece respirators all exhibit positive Poisson ratios—that is, they contract laterally when stretched and expand laterally when compressed. These lateral contractions and expansions may be noticed in a finished product that has been subject to heat and pressure during mask body manufacture.

SUMMARY OF THE INVENTION

The present invention pertains to a filtering face-piece respirator that comprises: (a) a harness; and (b) a mask body that comprises: (i) a filtering structure that comprises a filtration layer; and (ii) a support structure that comprises an auxetic mesh that has been molded into an intended shape.

The present invention also provides a new method of making a filtering face-piece respirator. The new method comprises: molding an auxetic mesh into an intended configuration for use in a mask body; supporting a filtering structure in the molded auxetic mesh; and joining a harness to the mask body.

The present invention differs from known filtering face-piece respirators in that the mask body comprises a support structure that includes a molded auxetic mesh. Although polymeric meshes have been successfully used as support structures in mask bodies, the mesh structures that have been used have not been auxetic—that is, they do not exhibit a negative Poisson ratio. Meshes that exhibit a negative Poisson ratio can be stretched in at least one dimension, causing the mesh to expand in the transverse direction. The inventor discovered that an auxetic mesh will distort less when molded. The auxetic mesh provides more uniformity in the size of mesh openings in the resulting molded structure. Improvements in mesh opening uniformity can provide a mask body that has better aesthetics. Known respiratory masks—which have used non-auxetic open-work meshes as the support structure—have exhibited obvious variations in the size of the mesh openings. The different sized openings may be considered unsightly, and portions of the mesh may sometimes overlap and distort during the molding operation. The present invention alleviates such issues and accordingly provides a molded filtering face-piece respirator that may be considered to have an improved appearance. When making respirators of the present invention, there can be less opportunity for respirator waste—as there may be less mask bodies that are discarded due to such manufacturing defects.

GLOSSARY

The terms set forth below will have the meanings as defined:

"auxetic" means exhibiting a negative Poisson's ratio;

"comprises (or comprising)" means its definition as is standard in patent terminology, being an open-ended term that is generally synonymous with "includes", "having", or "containing". Although "comprises", "includes", "having", and "containing" and variations thereof are commonly-used, open-ended terms, this invention also may be suitably described using narrower terms such as "consists essentially of", which is semi open-ended term in that it excludes only those things or elements that would have a deleterious effect on the performance of the inventive subject matter;

"clean air" means a volume of atmospheric ambient air that has been filtered to remove contaminants;

"contaminants" means particles (including dusts, mists, and fumes) and/or other substances that generally may not be considered to be particles (e.g., organic vapors, et cetera) but which may be suspended in air, including air in an exhale flow stream;

"crosswise dimension" is the dimension that extends laterally across the respirator from side-to-side when the respirator is viewed from the front;

"exhalation valve" means a valve that opens to allow a fluid to exit a filtering face mask's interior gas space;

"exterior gas space" means the ambient atmospheric gas space into which exhaled gas enters after passing through and beyond the mask body and/or exhalation valve;

"filtering face-piece" means that the mask body itself is designed to filter air that passes through it; there are no separately identifiable filter cartridges or insert-molded filter elements attached to or molded into the mask body to achieve this purpose;

"filter" or "filtration layer" means one or more layers of air-permeable material, which layer(s) is adapted for the primary purpose of removing contaminants (such as particles) from an air stream that passes through it;

"filtering structure" means a construction that is designed primarily for filtering air;

"harness" means a structure or combination of parts that assists in supporting the mask body on a wearer's face;

"interior gas space" means the space between a mask body and a person's face when a filtering face-piece respirator is being worn;

"mask body" means an air-permeable structure that is designed to fit over the nose and mouth of a person and that helps define an interior gas space separated from an exterior gas space;

"mesh" means a structure that has a network of open spaces and that is substantially larger in first and second dimensions than in a third;

"molded" or "molding" means forming into a desired shape using heat and pressure;

"multitude" means 100 or more;

"nose clip" means a mechanical device (other than a nose foam), which device is adapted for use on a mask body to improve the seal at least around a wearer's nose;

"perimeter" means the outer edge of the mask body, which outer edge would be disposed generally proximate to a wearer's face when the respirator is being donned by a person;

"polymer" means a material that contains repeating chemical units, regularly or irregularly arranged;

"polymeric" and "plastic" each mean a material that mainly includes one or more polymers and that may contain other ingredients as well;

"plurality" means two or more;

"respirator" means an air filtration device that is worn by a person to provide the wearer with clean air to breathe; and "support structure" means a construction that is designed to have sufficient structural integrity to retain its desired shape and to help retain the intended shape of the filtering structure that is supported by it.

DETAILED DESCRIPTION OF PREFERRED EMBODIMENTS

In practicing the present invention, a filtering face-piece respirator is provided that comprises an auxetic mesh as the shape-providing layer for the mask body. The inventor discovered that the use of an auxetic mesh not only provides structural integrity sufficient to give the mask body its desired shape and configuration but also does so in a manner that preserves the size of each of the open spaces in the mesh. As the auxetic mesh attains its three-dimensional shape during molding, the mesh deforms in a fractal manner, substantially retaining the initial mesh appearance, unlike distortions observed after conventional meshes are formed over bi-curved surfaces. Known meshes that are used as support structures or shaping layers in filtering face-piece respirators often exhibit distortions, creases, and fold-overs when molded into the desired three-dimensional shape. Before being molded, an auxetic mesh may be provided in an initial two-dimensional flat form, which is simple to handle and store. Converting the initial flat auxetic mesh into a three-dimensional shape may provide a more efficient manufacturing pathway when compared to batch processes that would normally be required to fabricate a similar defect-free netting. That is, if a non-auxetic mesh is used to produce a three-dimensional product, without the distortions mentioned above, a batch-type casting or injection molding process typically would be employed for that purpose.

Figure 1:
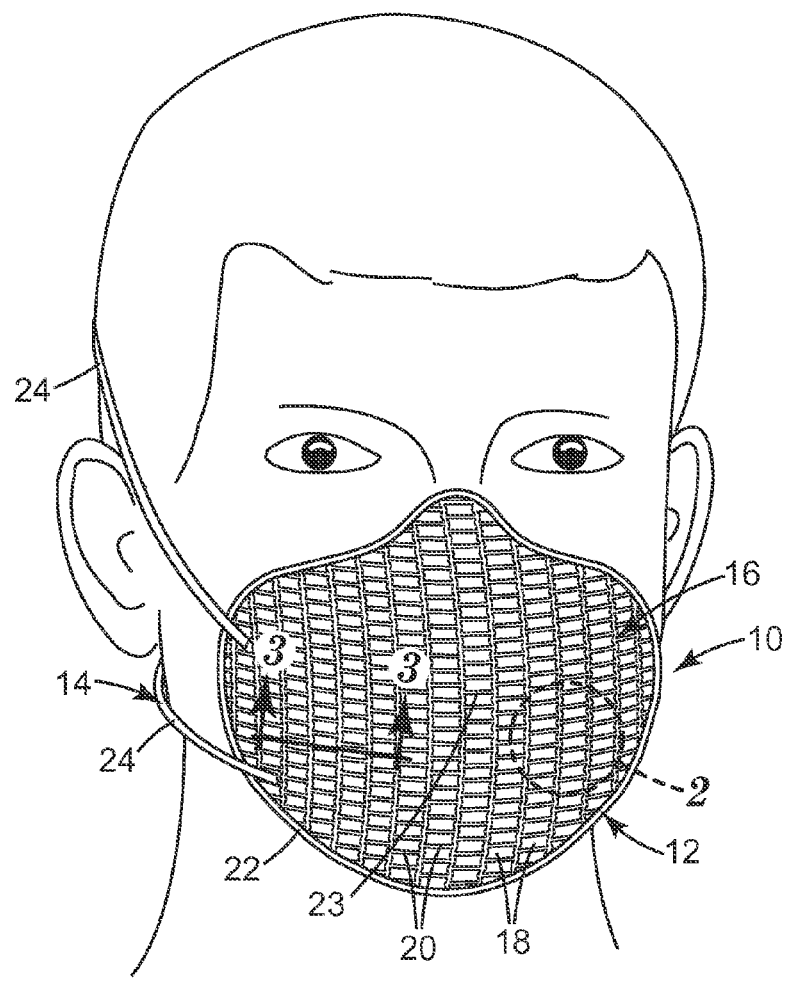
FIG. 1 shows a front perspective view of a filtering face-piece respirator 10, in accordance with the present invention, being worn on a person's face.

FIG. 1 shows an example of a filtering face-piece respirator 10 that may be used in accordance with the present invention to provide clean air for a wearer to breathe. The filtering face-piece respirator 10 includes a mask body 12 and a harness 14. The mask body 12 has a support structure 16 that provides structural integrity to the mask body and that provides support for a filtering structure 18 that resides behind the support structure 16. The filtering structure 18 removes contaminants from the ambient air when a wearer of the respirator 10 inhales. The support structure 16 includes an auxetic mesh 20 that is molded into a three-dimensional configuration, which defines the shape of the mask body 12. The auxetic mesh 20, when in its molded configuration, can provide the structural integrity sufficient for the mask body 12 to retain its intended configuration. The filtering structure 18 may be secured to the support structure 16 at the mask body perimeter 22. The filtering structure 18 also may be secured to the support structure 16 at the apex 23 of the mask body when an exhalation valve (not shown) is secured thereto. The harness 14 may include one or more straps 24 that enable the mask body 12 to be supported over the nose and mouth of a person. Adjustable buckles may be provided on the harness to allow the straps 24 to be adjusted in length. Fastening or clasping mechanisms also may be attached to the straps to allow the harness 14 to be disassembled when removing the respirator 10 from a person's face and reassembled when donning the respirator 10 from a person's face.

Figure 2:
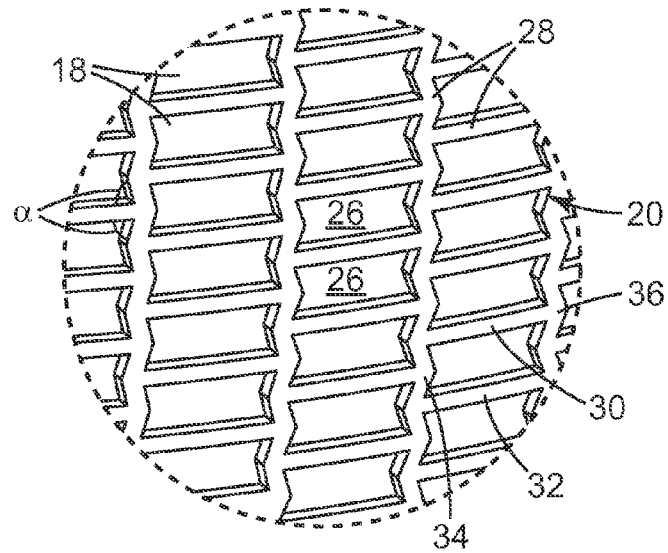
FIG. 2 is an enlarged view of the region circled in FIG. 1.

FIG. 2 shows an enlarged view of the open-work auxetic mesh 20, which may be used in connection with the present invention. As illustrated, the auxetic mesh 20 includes a multitude of open spaces 26 that may be defined by polymeric strands 28. The strands 28 that define each open space 26 may include first and second sides 30 and 32 and third and fourth sides 34 and 36. The first and second sides 30 and 32 may be linear, whereas the third and fourth sides may be non-linear and include segments that are offset non-perpendicularly to the first and second sides 30 and 32. The offset segments do not form right angles to the first and second sides 30 and 32. Rather, they form a chevron end that has angles α that may be about 20 to 80 degrees, more typically about 40 to 70 degrees. Each opening typically has a size of about 5 to 50 square millimeters ($mm^2$), more typically about 10 to 35 $mm^2$. Other known or later developed auxetic geometries may be suitably used in the present invention. The Poisson ratio of the auxetic mesh typically is less than −0.2, more typically less than −0.4, and still more typically less than −0.7, but usually is not further less than −2.2. Examples of meshes that exhibit negative Poisson ratios and that may be suitable for use in connection with the present invention are described in U.S. Patent Application Publication 2006/0129227A2 to Hengelmolen and 2006/0180505A1 to Alderson et al. At the upper end, the Poisson ratio is not greater than zero. The multitude of openings in the mesh, after being molded, tend to maintain similar sizes. When tested according to the Cell Size Determination method described below, the standard deviation of cell sizes was less than 0.04, 0.03, and even less than 0.025.

Figure 3:
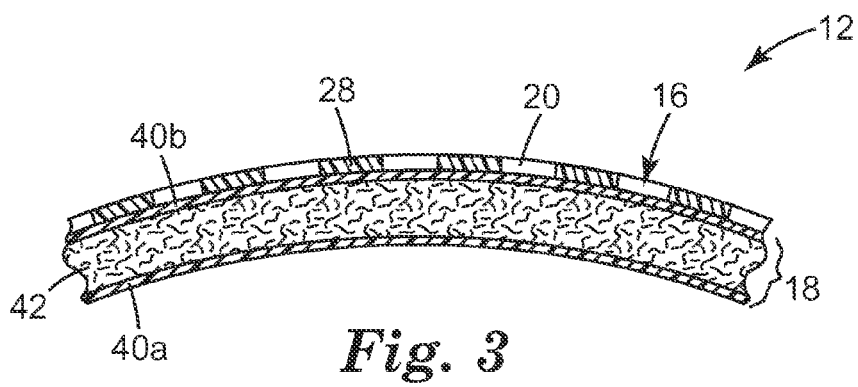
FIG. 3 is a cross-section of the mask body 12 taken along lines 3-3 of FIG. 1.

FIG. 3 shows a cross-section of the mask body 12, which includes the support structure 16 and the filtering structure 18. The support structure 16 typically has a thickness of about 0.60 to 0.85 millimeters (mm), and each strand 28 typically has an average cross-sectional area of about 0.1 to 3.5 mm$^2$, more typically of about 1.5 to 2.6 mm$^2$. The auxetic mesh 20 may reside on an outer surface of the mask body, or it may reside on an inner surface, or between other layers that comprise the mask body. Further, the auxetic mesh may be made from a variety of polymeric materials. Polymers suitable for auxetic mesh formation are generally either a thermoplastic or a thermoset material. Thermoplastic materials are materials which melt and/or flow upon the application of heat, resolidify upon cooling and again melt and/or flow upon the application of heat. The thermoplastic material undergoes only a physical change upon heating and cooling, no appreciable chemical change occurs. Thermoset materials, however, are curable materials that irreversibly cure, such as becoming crosslinked, when heated or cured. Once cured, the thermoset material will not appreciably melt or flow upon application of heat.

Examples of thermoplastic polymers that can be used to form auxetic meshes include: polyolefins, such as polyethylenes, polypropylenes, polybutylenes, blends of two or more of such polyolefins, and copolymers of ethylene and/or propylene with one another and/or with small amounts of copolymerizable, higher, alpha olefins, such as pentene, methylpentene, hexene, or octene; halogenated polyolefins, such as chlorinated polyethylene, poly(vinylidene fluoride), poly(vinylidene chloride), and plasticized poly(vinyl chloride); copolyester-ether elastomers of cyclohexane dimethanol, tetramethylene glycol, and terephthalic acid; copolyester elastomers such as block copolymers of polybutylene terephthalate and long chain polyester glycols; polyethers, such as polyphenyleneoxide; polyamides, such as poly(hexamethylene adipamide), e.g., nylon 6 and nylon 6,6; nylon elastomers; such as nylon 11, nylon 12, nylon 6,10 and polyether block polyamides; polyurethanes; copolymers of ethylene, or ethylene and propylene, with (meth)acrylic acid or with esters of lower alkanols and ethylenically-unsaturated carboxylic acids, such as copolymers of ethylene with (meth)acrylic acid, vinyl acetate, methyl acrylate, or ethyl acrylate; ionomers, such as ethylene-methacrylic acid copolymer stabilized with zinc, lithium, or sodium counterions; acrylonitrile polymers, such as acrylonitrile-butadiene-styrene copolymers; acrylic copolymers; chemically-modified polyolefins, such as maleic anhydride- or acrylic acid-grafted homo- or copolymers of olefins and blends of two or more of such polymers, such as blends of polyethylene and poly(methyl acrylate), blends of ethylene-vinyl acetate copolymer and ethylene-methyl acrylate; blends of polyethylene and/or polypropylene with poly(vinyl acetate); and thermoplastic elastomer block copolymers of styrene of the A-B or A-B-A type, where A represents a thermoplastic polystyrene block and B represents a rubbery block of polyisoprene, polybutadiene, or poly(ethylene/butylene), examples include linear, radial, star and tapered styrene-isoprene block copolymers, linear styrene-(ethylene-butylene) block copolymers, and linear, radial, and star styrene-butadiene block copolymers. The foregoing polymers are normally solid, generally high molecular weight, and melt-extrudable such that they can be heated to form molten viscous liquids which can be pumped as streams to the extrusion die assembly and readily extruded therefrom under pressure.

Examples of suitable commercially-available polymers include: those sold as "ELVAX" ethylene-vinyl acetate copolymers, such as ELVAX 40W, 4320, 250, and 350; those sold as "EMAC" ethylene-methyl acrylate copolymers, such as EMAC DS-1274, DS-1176, DS-1278-70, SP 2220 and SP-2260; those sold as "VISTA FLEX" thermoplastic elastomers, such as VISTA FLEX 641 and 671; those sold as "PRIMACOR" ethylene-acrylic acid copolymers, such as PRIMACOR 3330, 3440, 3460, and 5980; those sold as "FUSABOND" maleic anhydride-polyolefin copolymers, such as FUSABOND MB-110D and MZ-203D; those sold as "HIMONT" ethylene-propylene copolymers, such as HIMONT KS-057, KS-075, and KS-051P; those sold as "FINA" polypropylenes, such as FINA 3860X; those sold as "ESCORENE" polypropylenes, such as ESCORENE 3445; the polymer sold as "VESTOPLAST 750" ethylene-propylene-butene copolymer; those sold as "SURLYN" ionomers, such as SURLYN 9970 and 1702; those sold as "ULTRAMID" polyamides, such as ULTRAMID B3 nylon 6 and ULTRAMID A3 nylon 6,6; those sold as "ZYTEL" polyamides, such as ZYTEL FE3677 nylon 6,6; those sold as "RILSAN" polyamide elastomers, such as BMNO P40, BESNO P40 and BESNO P20 nylon 11; those sold as "PEBAX" polyether block polyamide elastomers, such as PEBAX 2533, 3533, 4033, 5562 and 7033; those sold as "HYTREL" polyester elastomers, such as HYTREL 3078, 4056 and 5526; those sold as "KRATON" and "EUROPRENE SOL TE" styrene block copolymers, such as KRATON D1107P, G1657, G1750X, and D1118X and EUROPRENE SOL TE 9110, and 6205.

As mentioned above, blends of two or more materials may also be used in the manufacture of auxetic meshes. Examples of such blends include: a blend of 85 to 15 wt % poly(ethylene-vinyl acetate), such as "ELVAX" copolymer, with 15 to 85 wt % poly(ethylene-acrylic acid), such as "PRIMACOR" polymer, the poly(ethylene-vinyl acetate) component of the blend generally will have a weight average molecular weight, $M_w$, of 50,000 to 220,000 and will have 5 to 45 mol % of its interpolymerized units derived from the vinyl acetate comonomer and the balance of units from ethylene, the poly (ethylene-acrylic acid) component of the blend generally will have a $M_w$ of 50,000 to 400,000 and have 1 to 10 mol % of its interpolymerized units derived from acrylic acid and the balance from ethylene; a blend of 20 to 70 wt % poly(ethylene-propylene-butene) terpolymer having $M_w$ of 40,000 to 150,000 and derived from equally large amounts of butene and propylene and a small amount of ethylene, such as "VESTOPLAST 750" polymer, with 80 to 30 wt % isotactic polypropylene; a blend that contains from 15 to 85 wt % poly(ethylene-vinyl acetate) and 85 to 15 wt % poly(ethylene-methyl acrylate), such as "EMAC" polymer, the poly(ethylene-vinyl acetate) component of this blend can have a molecular weight and composition like that described above, the poly(methyl acrylate) component can have a $M_w$ of 50,000 to 200,000 and 4 to 40 mole % of its interpolymerized units derived from the methyl acrylate comonomer.

Polypropylene may be preferred for use in the auxetic mesh 20 to enable proper welding of the support structure to the filtering structure (filtering layers often comprise polypropylene as well). The polymeric materials used to make the auxetic mesh 20 typically have a Young's modulus of about 0.3 to 1900 Mega Pascals (MPa), more typically 2 to 250 MPa. As shown in FIG. 3, the filtering structure 18 may include one or more cover webs 40a and 40b and a filtration layer 42. The cover webs 40a and 40b may be located on opposing sides of the filtration layer 42 to capture any fibers that could come loose therefrom. Typically, the cover webs 40a and 40b are made from a selection of fibers that provide a comfortable feel, particularly on the side of the filtering structure 18 that makes contact with the wearer's face. The construction of various filter layers and cover webs that may be used in conjunction with the support structure of the present invention are described below in more detail. To improve fit and wearer comfort, an elastomeric face seal can be secured to the perimeter of the filtering structure 18. Such a face seal may extend radially inward to contact the wearer's face when the respirator is being donned. Examples of face seals are described in U.S. Pat. No. 6,568,392 to Bostock et al., U.S. Pat. No. 5,617,849 to Springett et al., and U.S. Pat. No. 4,600,002 to Maryyanek et al., and in Canadian Patent 1,296,487 to Yard. The mask body may be molded, for example, using the processes mentioned and described in U.S. Pat. No. 7,131,442B1 to Kronzer et al.

The mask body that is used in connection with the present invention may take on a variety of different shapes and configurations. Although a filtering structure has been illustrated with multiple layers that include a filtration layer and two cover webs, the filtering structure may simply comprise a combination of filtration layers or a combination of filter layer(s) and cover web(s). For example, a pre-filter may be disposed upstream to a more refined and selective downstream filtration layer. Additionally, sorptive materials such as activated carbon may be disposed between the fibers and/or various layers that comprise the filtering structure. Further, separate particulate filtration layers may be used in conjunction with sorptive layers to provide filtration for both particulates and vapors. The filtering structure could have one or more horizontal and/or vertical lines of demarcation (such as a weld line or fold line) that contribute to its structural integrity. The filtering structure 18 is generally configured to fit within the support structure 16.

The filtering structure that is used in a mask body of the invention can be of a particle capture or gas and vapor type filter. The filtering structure also may be a barrier layer that prevents the transfer of liquid from one side of the filter layer to another to prevent, for instance, liquid aerosols or liquid splashes (e.g. blood) from penetrating the filter layer. Multiple layers of similar or dissimilar filter media may be used to construct the filtering structure of the invention as the application requires. Filters that may be beneficially employed in a layered mask body of the invention are generally low in pressure drop (for example, less than about 195 to 295 Pascals at a face velocity of 13.8 centimeters per second) to minimize the breathing work of the mask wearer. Filtration layers additionally are flexible and have sufficient shear strength to enable product manufacture and to generally retain their structure under the expected use conditions. Examples of particle capture filters include one or more webs of fine inorganic fibers (such as fiberglass) or polymeric synthetic fibers. Synthetic fiber webs may include electret-charged polymeric microfibers that are produced from processes such as melt-blowing. Polyolefin microfibers formed from polypropylene that has been electrically charged provide particular utility for particulate capture applications. An alternate filter layer may comprise a sorbent component for removing hazardous or odorous gases from the breathing air. Sorbents may include powders or granules that are bound in a filter layer by adhesives, binders, or fibrous structures—see U.S. Pat. No. 6,334,671 to Springett et al. and U.S. Pat. No. 3,971,373 to Braun. A sorbent layer can be formed by coating a substrate, such as fibrous or reticulated foam, to form a thin coherent layer. Sorbent materials may include activated carbons that are chemically treated or not, porous alumna-silica catalyst substrates, and alumna particles. An example of a sorptive filtration structure that may be conformed into various configurations is described in U.S. Pat. No. 6,391,429 to Senkus et al.

The filtration layer is typically chosen to achieve a desired filtering effect. The filtration layer generally will remove a high percentage of particles and/or or other contaminants from the gaseous stream that passes through it. For fibrous filter layers, the fibers selected depend upon the kind of substance to be filtered and, typically, are chosen so that they do not become bonded together during the molding operation. As indicated, the filtration layer may come in a variety of shapes and forms and typically has a thickness of about 0.2 millimeters (mm) to 1 centimeter (cm), more typically about 0.3 mm to 0.5 cm, and it could be a generally planar web or it could be corrugated to provide an expanded surface area—see, for example, U.S. Pat. Nos. 5,804,295 and 5,656,368 to Braun et al. The filtration layer also may include multiple filtration layers joined together by an adhesive or any other means. Essentially any suitable material that is known (or later developed) for forming a filtering layer may be used as the filtering material. Webs of melt-blown fibers, such as those taught in Wente, Van A., *Superfine Thermoplastic Fibers*, 48 Indus. Engn. Chem., 1342 et seq. (1956), especially when in a persistent electrically charged (electret) form are especially useful (see, for example, U.S. Pat. No. 4,215,682 to Kubik et al.). These melt-blown fibers may be microfibers that have an effective fiber diameter less than about 20 micrometers (μm) (referred to as BMF for "blown microfiber"), typically about 1 to 12 μm. Effective fiber diameter may be determined according to Davies, C. N., *The Separation Of Airborne Dust Particles*, Institution Of Mechanical Engineers, London, Proceedings 1B, 1952. Particularly preferred are BMF webs that contain fibers formed from polypropylene, poly(4-methyl-1-pentene), and combinations thereof. Electrically charged fibrillated-film fibers as taught in van Turnhout, U.S. Pat. Re. 31,285, also may be suitable, as well as rosin-wool fibrous webs and webs of glass fibers or solution-blown, or electrostatically sprayed fibers, especially in microfilm form. Electric charge can be imparted to the fibers by contacting the fibers with water as disclosed in U.S. Pat. No. 6,824,718 to Eitzman et al., U.S. Pat. No. 6,783,574 to Angadjivand et al., U.S. Pat. No. 6,743,464 to Insley et al., U.S. Pat. No. 6,454,986 and U.S. Pat. No. 6,406,657 to Eitzman et al., and U.S. Pat. Nos. 6,375,886 and 5,496,507 to Angadjivand et al. Electric charge also may be imparted to the fibers by corona charging as disclosed in U.S. Pat. No. 4,588,537 to Klasse et al. or by tribocharging as disclosed in U.S. Pat. No. 4,798,850 to Brown. Also, additives can be included in the fibers to enhance the filtration performance of webs produced through the hydro-charging process (see U.S. Pat. No. 5,908,598 to Rousseau et al.). Fluorine atoms, in particular, can be disposed at the surface of the fibers in the filter layer to improve filtration performance in an oily mist environment—see U.S. Pat. Nos. 6,398,847 B1, 6,397,458 B1, and 6,409,806B1 to Jones et al., U.S. Pat. No. 7,244,292 to Kirk et al., and U.S. Pat. No. 7,244,291 to Spartz et al. Typical basis weights for electret BMF filtration layers are about 10 to 100 grams per square meter. When electrically charged according to techniques described in, for example, the '507

Angadjivand et al. patent, and when including fluorine atoms as mentioned in the Jones et al., Kirk et al., and Spartz et al. patents, the basis weight may be about 20 to 40 $g/m^2$ and about 10 to 30 $g/m^2$, respectively.

An inner cover web can be used to provide a smooth surface for contacting the wearer's face, and an outer cover web can optionally be used to entrap loose fibers in the mask body or for aesthetic reasons. The cover web typically does not provide any substantial filtering benefits to the filtering structure, although it can act as a pre-filter when disposed on the exterior (or upstream to) the filtration layer. To obtain a suitable degree of comfort, an inner cover web preferably has a comparatively low basis weight and is formed from comparatively fine fibers. More particularly, the cover web may be fashioned to have a basis weight of about 5 to 50 $g/m^2$ (typically 10 to 30 $g/m^2$). Fibers used in the cover web often have an average fiber diameter of about 5 to 24 micrometers, typically of about 7 to 18 micrometers, and more typically of about 8 to 12 micrometers. The cover web material may have a degree of elasticity (typically, but not necessarily, 100 to 200% at break) and may be plastically deformable.

Suitable materials for the cover web may be blown microfiber (BMF) materials, particularly polyolefin BMF materials, for example polypropylene BMF materials (including polypropylene blends and also blends of polypropylene and polyethylene). A suitable process for producing BMF materials for a cover web is described in U.S. Pat. No. 4,013,816 to Sabee et al. The web may be formed by collecting the fibers on a smooth surface, typically a smooth-surfaced drum or a rotating collector—see U.S. Pat. No. 6,492,286 to Berrigan et al. Spun-bond fibers also may be used.

A typical cover web may be made from polypropylene or a polypropylene/polyolefin blend that contains 50 weight percent or more polypropylene. These materials have been found to offer high degrees of softness and comfort to the wearer and also, when the filter material is a polypropylene BMF material, to remain secured to the filter material without requiring an adhesive between the layers. Polyolefin materials that are suitable for use in a cover web may include, for example, a single polypropylene, blends of two polypropylenes, and blends of polypropylene and polyethylene, blends of polypropylene and poly(4-methyl-1-pentene), and/or blends of polypropylene and polybutylene. One example of a fiber for the cover web is a polypropylene BMF made from the polypropylene resin "Escorene 3505G" from Exxon Corporation, providing a basis weight of about 25 $g/m^2$ and having a fiber denier in the range 0.2 to 3.1 (with an average, measured over 100 fibers of about 0.8). Another suitable fiber is a polypropylene/polyethylene BMF (produced from a mixture comprising 85 percent of the resin "Escorene 3505G" and 15 percent of the ethylene/alpha-olefin copolymer "Exact 4023" also from Exxon Corporation) providing a basis weight of about 25 $g/m^2$ and having an average fiber denier of about 0.8. Suitable spunbond materials are available, under the trade designations "Corosoft Plus 20", "Corosoft Classic 20" and "Corovin PP-S-14", from Corovin GmbH of Peine, Germany, and a carded polypropylene/viscose material available, under the trade designation "370/15", from J.W. Suominen OY of Nakila, Finland.

Cover webs that are used in the invention preferably have very few fibers protruding from the web surface after processing and therefore have a smooth outer surface. Examples of cover webs that may be used in the present invention are disclosed, for example, in U.S. Pat. No. 6,041,782 to Angadjivand, U.S. Pat. No. 6,123,077 to Bostock et al., and WO 96/28216A to Bostock et al.

The strap(s) that are used in the harness may be made from a variety of materials, such as thermoset rubbers, thermoplastic elastomers, braided or knitted yarn/rubber combinations, inelastic braided components, and the like. The strap(s) may be made from an elastic material such as an elastic braided material. The strap preferably can be expanded to greater than twice its total length and be returned to its relaxed state. The strap also could possibly be increased to three or four times its relaxed state length and can be returned to its original condition without any damage thereto when the tensile forces are removed. The elastic limit thus is preferably not less than two, three, or four times the length of the strap when in its relaxed state. Typically, the strap(s) are about 20 to 30 cm long, 3 to 10 mm wide, and about 0.9 to 1.5 mm thick. The strap(s) may extend from the first tab to the second tab as a continuous strap or the strap may have a plurality of parts, which can be joined together by further fasteners or buckles. For example, the strap may have first and second parts that are joined together by a fastener that can be quickly uncoupled by the wearer when removing the mask body from the face. An example of a strap that may be used in connection with the present invention is shown in U.S. Pat. No. 6,332,465 to Xue et al. Examples of fastening or clasping mechanisms that may be used to join one or more parts of the strap together are shown, for example, in U.S. Pat. No. 6,062,221 to Brostrom et al., U.S. Pat. No. 5,237,986 to Seppala, and EP1,495,785A1 to Chien.

Cover webs that are used in the invention preferably have very few fibers protruding from the web surface after processing and therefore have a smooth outer surface. Examples of cover webs that may be used in the present invention are disclosed, for example, in U.S. Pat. No. 6,041,782 to Angadjivand, U.S. Pat. No. 6,123,077 to Bostock et al., and WO 96/28216A to Bostock et al.

The straps that are used in the harness may be made from a variety of materials, such as thermoset rubbers, thermoplastic elastomers, braided or knitted yarn/rubber combinations, inelastic braided components, and the like. The straps may be made from an elastic material such as an elastic braided material. The strap preferably can be expanded to greater than twice its total length and be returned to its relaxed state. The strap also may be increased to three or four times its relaxed state length and can be returned to its original condition without any damage thereto when the tensile forces are removed. The elastic limit thus is preferably not less than two, three, or four times the length of the strap when in its relaxed state. Typically, the straps are about 25 to 60 cm long, 5 to 10 mm wide, and about 0.9 to 1.5 mm thick. The straps may extend from the first buckle to a second buckle on an opposing side of the mask body as a continuous strap or the strap may have a plurality of parts, which can be joined together by further fasteners or buckles. For example, the strap may have first and second parts that are joined together by a fastener that can be quickly uncoupled by the wearer when removing the mask body from the face. An example of a strap that may be used in connection with the present invention is shown in U.S. Pat. No. 6,332,465 to Xue et al. Examples of fastening or clasping mechanism that may be used to joint one or more parts of the strap together is shown, for example, in the following U.S. Pat. No. 6,062,221 to Brostrom et al., U.S. Pat. No. 5,237,986 to Seppala, and EP1,495,785A1 to Chien.

An exhalation valve may be attached to the mask body to facilitate purging exhaled air from the interior gas space. The use of an exhalation valve may improve wearer comfort by rapidly removing the warm moist exhaled air from the mask interior. See, for example, U.S. Pat. Nos. 7,188,622, 7,028, 689, and 7,013,895 to Martin et al.; U.S. Pat. Nos. 7,428,903, 7,311,104, 7,117,868, 6,854,463, 6,843,248, and 5,325,892 to Japuntich et al.; U.S. Pat. No. 6,883,518 to Mittelstadt et al.; and RE37,974 to Bowers. Essentially any exhalation valve that provides a suitable pressure drop and that can be properly secured to the mask body may be used in connection with the present invention to rapidly deliver exhaled air from the interior gas space to the exterior gas space.

A nose clip also may be attached to the mask body to improve fit over the nose region. See, for example, U.S. Pat. Nos. 5,558,089 and D412,573 to Castiglione.

EXAMPLES

Cell Size Determination

Auxetic mesh cell size was determined using defined diameter rods that were mounted in a fixture to facilitate measurement of the open spaces or cells. The probe rods ranged in diameter from 0.0254 cm (centimeter) to 0.5334 cm, in 0.0254 cm increments. The cell size was measured by selecting the maximum size probe that fit into the cell without causing distortion of the cell shape prior to placement of the probe. This size was recorded, and the next cell size was measured and recorded until all cells contained within the molded mesh were measured and the cells tallied at each probe size.

Auxetic Mesh Formation Apparatus and Process

Figure 4:
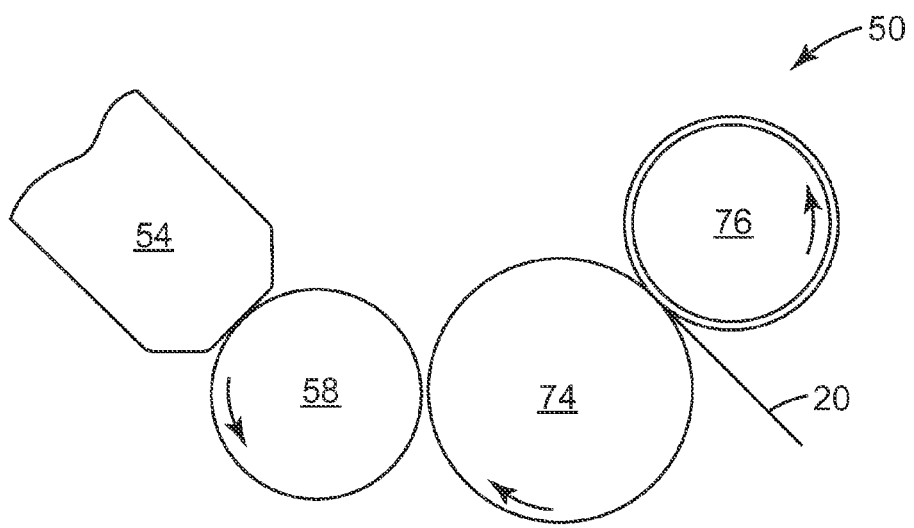
FIG. 4 is a schematic view of an apparatus 50 for making an auxetic mesh 20.

An auxetic web was produced using a system 50 that resembles the apparatus shown in FIG. 4. A 40 mm diameter twin-screw extruder was fitted with a gear pump and was used to deliver a molten polymer blend at melt temperature of approximately 246° C. to a slot die 54, at an extrusion rate of 1.43 kg/hr/cm (kilogram per hour per length of die in centimeters). The polymer blend contained a three-part polymer composition that included pigment and anti-block agents. The polymer blend formulation is given below in Table 1. At the end of the slot die 54, the polymer blend is transferred to a casting roll 58 where the auxetic mesh is formed. The resulting mesh 20 is removed from the casting roll 58 where it is transferred to take-off roll 74. A back-up roll 76 contacts the take-off roll 74 to keep the auxetic mesh on the take-off role until the point of departure from the roll.

Figure 5:
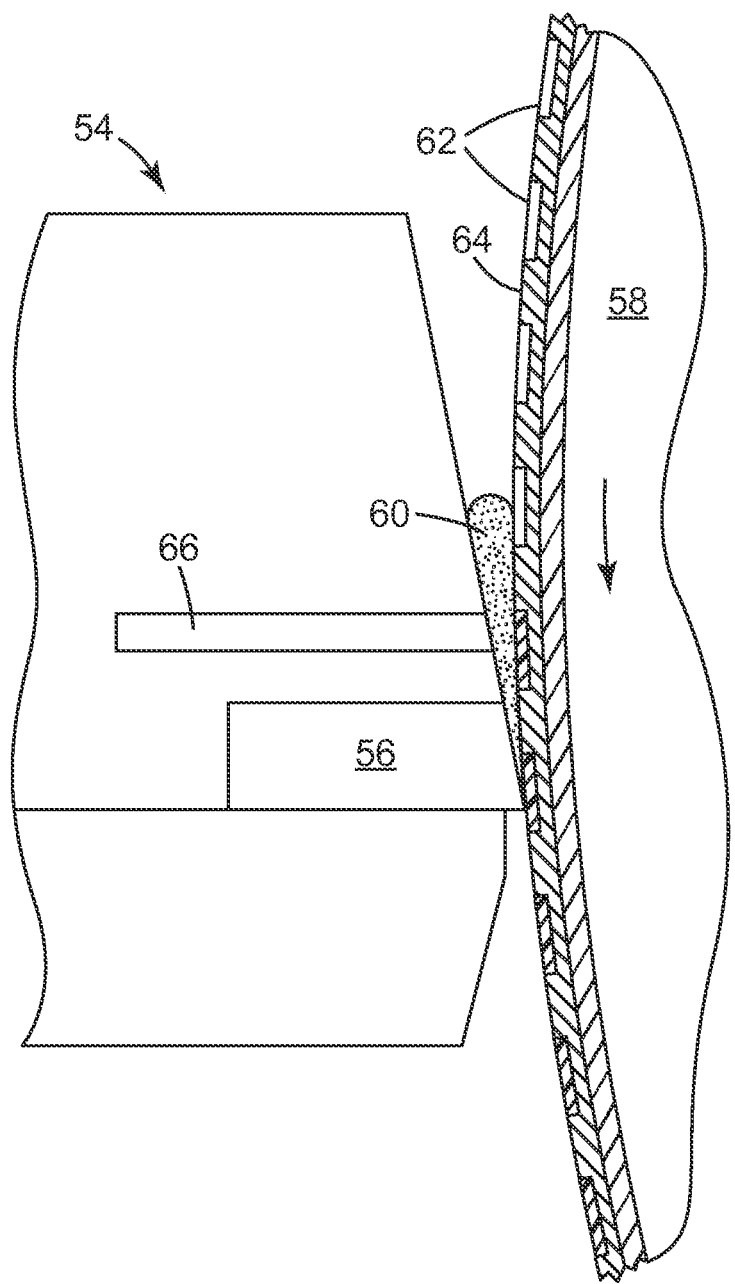
FIG. 5 is an enlarged view of the casting of the extruded polymeric material 60 onto the casting roll 58.

FIG. 5 shows the orientation of the slot die 54, doctor blade 56, and casting roll 58 in greater detail. The slot die 54 was maintained at a temperature of about 246° C. and was positioned relative to the casting roll 58 such that a bank 60 of molten polymer was formed along a horizontal plane. The molten polymer 60 was forced into the casting roll cavity 62 by rotating the casting roll 58 against the doctor blade 56. The doctor blade 56 both forced molten polymer 60 into the casting roll cavity 62 and wiped the outer surface 64 of the casting roll 58 so that the molten polymer 60 was left in the cavity alone. Polymer that was removed from the polymer bank 60 via the casting roll 58 was replenished through the resin channel 66 of the slot die 54. By this process, the auxetic mesh was continually casted.

TABLE 1

Polymer Blend Composition

| Weight Percent | Material Type | Trade Name | Supplier | Supplier location |
|---|---|---|---|---|
| 41% | Olefin Elastomer | Engage 8490 | DuPont Dow Elastomers LLC. | Wilmington, Delaware |
| 41% | LLDPE | Hypel ™ LLDPE 52 | Entec Polymers, LLC | Houston, Texas |
| 15% | SEBS | Kraton G1657 | Kraton Polymers LLC | Houston, Texas |
| 3% | LDPE | Yellow Pigment compounded with Atmer 1753 Erucamide (Loading indicated an next line) | Clariant Masterbatches | Chicago, Ill |
| 0.12% | Erucamide | Atmer 1753 | Unichema North America | Minneapolis, MN |

During processing, the doctor blade 56 was forced against the rotating casting roll 58 at a pressure of 0.656 kN/cm (kilo-Newtons per lineal cm)—a pressure that forced molten polymer 60 to fill the channels or cavities 62 of the casting roll 58. The doctor blade 56 was maintained at a temperature of 246° C. The polymer bank 60 assured that sufficient polymer was present across the transverse length of the casting roll 58 to fill the channels 62 of the casting roll.

As shown in FIG. 4, the apparatus 50 used a two-roll transfer system, which was composed of a chrome take-off roll 74 and a rubber-surfaced backup role 76, to extract the cast auxetic mesh 20 from the casting roll 58 and convey it to a collection apparatus. The takeoff role 74 contacted the casting roll 58 at a point 225° degrees counter clockwise (the direction of rotation) from the point of contact between the slot die 54 and casting roll 58. The backup roll 76 contacted the take-off roll 74 it a point 135° degrees clockwise (direction of rotation) from the point of contact between the casting roll 58 and take-off roll 74. Both rolls were maintained at a temperature of approximately 4.4° C. and had surface speeds of 5.0 m/min (meters per minute). The nip pressure between the casting roll 58 and take-off roll 74 was maintained at 4.37 N/cm; the nip pressure between the take-off roll 74 and the backup role 76 was 4.37 N/cm. After leaving the casting roll, the auxetic mesh 20 was transferred to the take-off roll 74 and was further cooled and conveyed through web handling rolls to a windup roll (not shown). The resulting mesh had a thickness of about 1.63 mm and a basis weight of 47 g/cm² (grams per square centimeter). The final wound roll of auxetic mesh contained an intermittent thin film of polymeric material between each of the auxetic pattern elements. All residual inter-element film was removed by hand using a tweezers. Other methods of residual film removal could include burning, heating, brushing, punching, etc.

Figure 6:
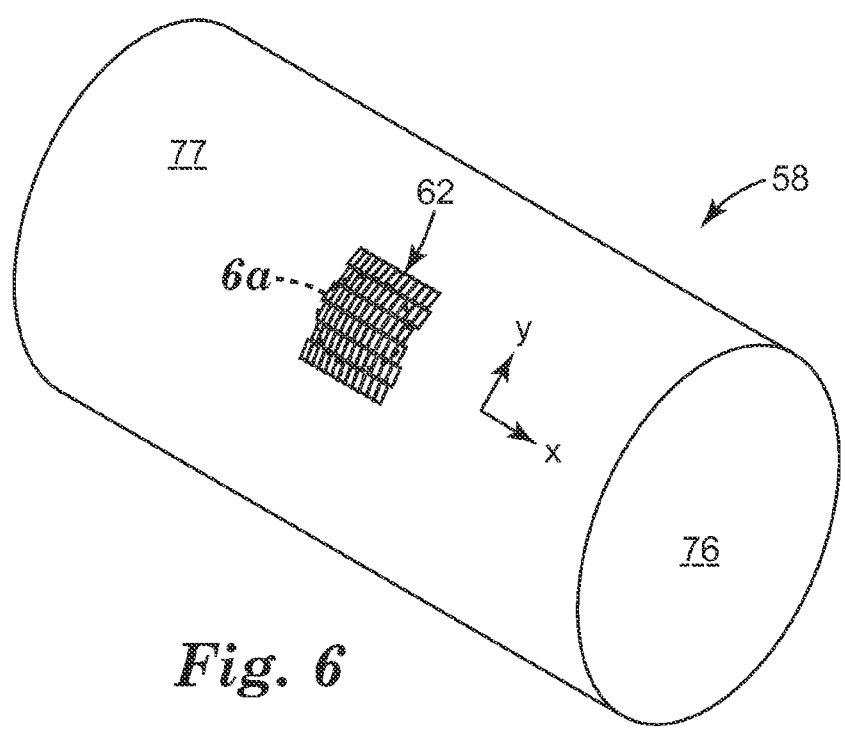
FIG. 6 is a perspective view of a casting roll 58 that may be used to make an auxetic mesh.
Figure 6A:
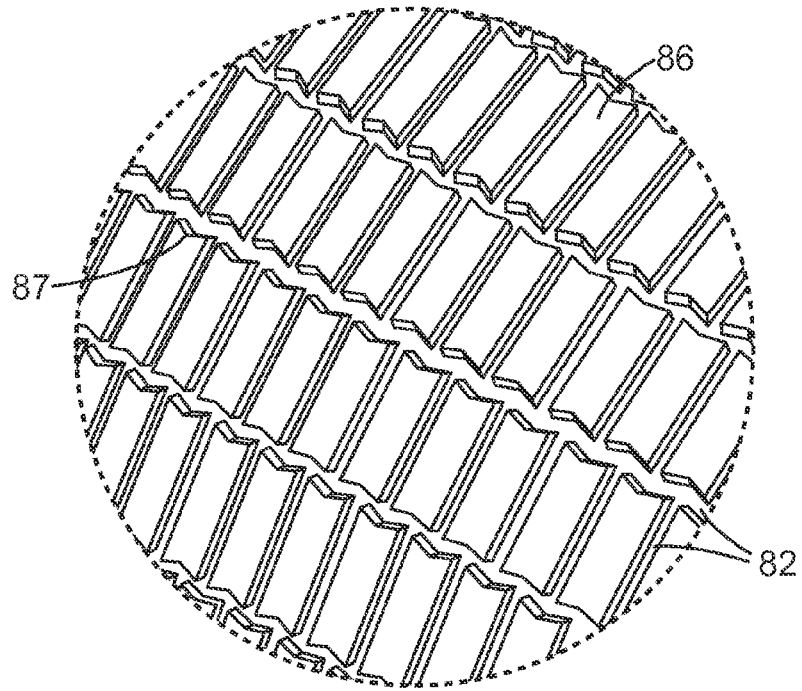
FIG. 6a is an enlarged view of a portion of the outer surface of casting roll 58 shown in FIG. 6.

As shown in FIGS. 6 and 6a, the casting roll 58 had an auxetic-shaped cavity pattern 62 machined into its face. The cavity pattern 62 was cut into the face 77 of a 23.5 cm diameter, chrome-surfaced, steel roll 58. The auxetic-shaped pattern 62 of interconnecting channels 82 was machined into the face 77 of the casting roll 58 using a Harvey Tool #11815-30 Carbide Miniature Tapered End Mill, Harvey Tool Company LLC, Rowley, Mass. having a 6° included angle. The channels 82 of the auxetic pattern 62 were machined to a depth of 1.143 mm, with the rectangular channel formed by 3° tapered edge. The channels 82 are defined by uncut "island" areas 86 in the roll face 77, whereby the machined area constituted the channels 82. The unmachined islands 86 on the roll face 84, onto which the doctor blade 56 rides during mesh formation, were the shape of elongated hexagons that had isosceles concave "chevron" ends 87.

Figure 7:
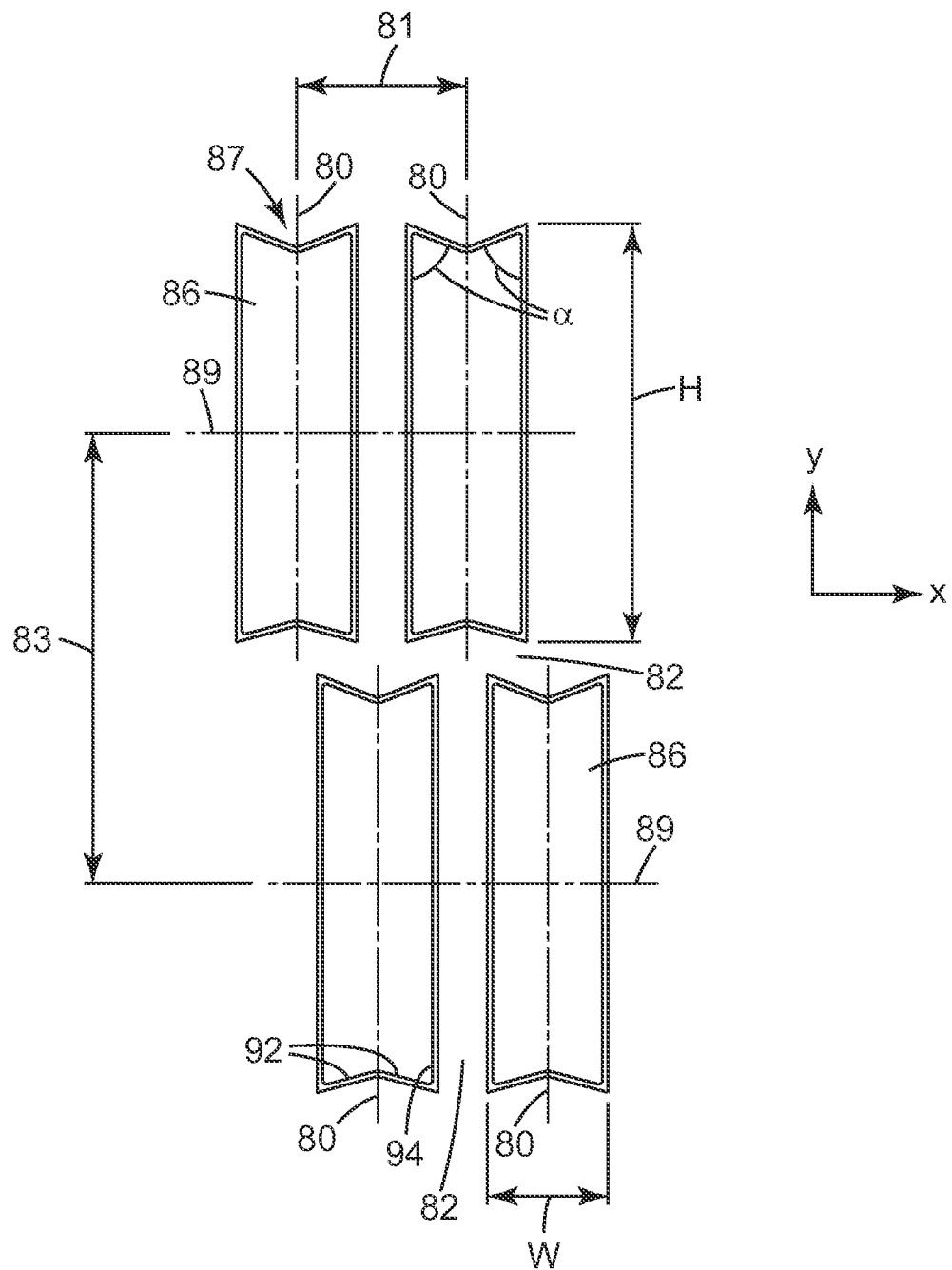
FIG. 7 is a plan view of an auxetic mold that may be used to make an auxetic mesh.
Figure 8:
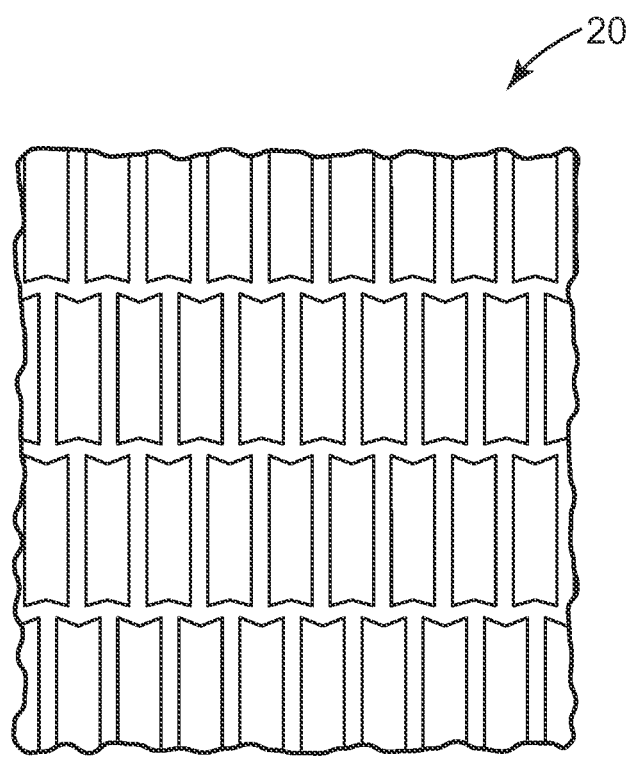
FIG. 8 is a front view of an auxetic mesh 20 that may be used in making a molded respirator in connection with the present invention.

As shown in FIG. 7, islands 86 were oriented on the roll 76 such that their long axis 80 aligned with the circumstantial line of the roll 76. The islands 86 had an overall height H and width W of 11.1 mm and 3.1 mm, respectively. Two equally length lines, 92 extending 1.67 mm from the ends of each major side 94 of the hexagon, and meeting at its long axis centerline 80, formed the end chevron 87 of an island 86. Islands were spaced apart, relative to their centerlines, either along their long axis 80 or narrow (short) axis 89. The long axes of all islands were parallel to the circumstantial line of the casting roll 76. The narrow axes 89, of the islands were oriented along the axis of the casting roll 58. Alternating transverse rows of islands were offset from the row above or below by one half the width of each island. Transverse spacing of the islands 81 was 4.27 mm from long axis 80 to an adjacent long axis 80. Circumstantial spacing 83 of the islands was 11.88 mm from short axis 89 to short axis 89. Angle α was 69 degrees. With the islands 86 formed in this manner, a network of channels 82 was created; these channels 82 were filled with polymer during the casting process and acted as molds for the auxetic mesh 20. FIG. 8 shows an image of the molded auxetic mesh 20 produced as described above.

Auxetic Mesh Characterization Test Method

Auxetic mesh produced as described in the Auxetic Mesh Formation Apparatus and Process were evaluated for their auxetic properties through a tensile testing procedure. In this procedure, a 10.2 cm by 1.0 cm section of mesh was cut such that the long axes of the mesh cells were oriented in line with the transverse axis of the tensile testing apparatus. The crosshead speed of the tensile testing apparatus was maintained at 50.8 centimeters per minute until the sample was elongated to 50 and 100 percent of its original length. As is indicative of an auxetic structure, when placed under tension, the sample section increased in width in response to axial loading. The sample increased to a width of 105 percent of its original width at both elongations.

Three-Dimensional Molding of an Auxetic Mesh

Auxetic mesh produced as described in the Auxetic Mesh Formation Apparatus and Process section was molded into a three-dimensional cup shape. The auxetic mesh was molded into the cup shape of a respirator by draping a 21.5 cm by 25.5 cm section of mesh over an aluminum male mold. The mold had a generally hemispherical shape with an elliptical base with a major axis of 13.3 cm, and a minor axis of 10.5 cm, and a dome height of 4.4 cm. The hemispherical-shape mold was fixed to a rectangular aluminum plate that extended approximately 3.4 cm beyond the base of the mold. The section of auxetic mesh was draped over the mold so that it's edges extended beyond the outer perimeter of the base plate. A perimeter aluminum frame, with an interior cutout that mirrored the perimeter of the mold, was placed over the auxetic mesh and mold so that the mesh could be drawn over the mold without significant mesh distortion. The perimeter frame was then fixed to the base plate to hold the mesh in position against the mold. The mold, mesh, and securing plate assembly was placed in a preheated, air circulating oven for 20 minutes at a temperature of 105 C. After heating in the oven for the specified duration, the assembly was removed from the oven and was allowed to cool to room temperature. When the assembly reached room temperature, the perimeter frame was uncoupled from the base plate, and the resultant molded auxetic mesh removed from the mold. It was observed that the molded auxetic mesh retained its general auxetic structure, and it was shape-retaining even after compression in the mold. It was also noted that the auxetic mesh was able to easily adapt to the male mold shape without significant distortions to the mesh, such as folds or creases.

Respirator Cell Size Comparison

A respirator shell mesh was produced as described above in the Three-Dimensional Molding of Auxetic Mesh section was evaluated for cell size uniformity by surveying the size of the cells over the entirety of the mold structure. The cell size uniformity of the auxetic mesh was compared to the uniformity of shell meshes that were removed from commercially available filtering face-piece respiratory masks. Detailed measurements of the cell opening size and size distribution for each of several shell meshes were determined. Respirator shell mesh was evaluated from a JSP 822 mask, manufactured by JSP Ltd, Oxfordshire, UK; a Venus 190 mask, produced by Nani Mumbai-MN, India; a 2200 mask inner shell, a 2200 mask outer shell, and a 2600 outer shell, all manufactured by Moldex-Metric, Culver City, Calif. The meshes were removed from the filter media to enable cell size measurement, the exception being the 3M auxetic mesh which was free standing. Each cell opening size was measured and recorded for the entire mesh using gauging probes as described above in Cell Size Determination.

The resulting measurements were compiled to provide the number of cells contained within the mesh of a given size, see Table 2. From this data the cell size distribution and standard deviation determined were determined and are given in Table 2.

TABLE 2

Cell Size Distribution

| Probe Size (cm) | JSP 822 | Venus 190 | Moldex 2200 Inner Shell | Moldex 2600 Outer Shell | Moldex 2200 Outer Shell | Molded Auxetic Mesh |
| --- | --- | --- | --- | --- | --- | --- |
| 0.0254 | 1 | 1 | 0 | 1 | 2 | 0 |
| 0.0508 | 4 | 0 | 3 | 5 | 3 | 0 |
| 0.0762 | 3 | 0 | 2 | 5 | 5 | 0 |
| 0.1016 | 25 | 2 | 7 | 10 | 8 | 0 |
| 0.127 | 51 | 5 | 6 | 24 | 10 | 0 |
| 0.1524 | 92 | 7 | 14 | 20 | 34 | 0 |
| 0.1778 | 99 | 32 | 22 | 70 | 43 | 2 |
| 0.2032 | 96 | 32 | 22 | 77 | 81 | 11 |
| 0.2286 | 82 | 36 | 50 | 164 | 192 | 54 |
| 0.254 | 68 | 57 | 48 | 194 | 116 | 99 |
| 0.2794 | 66 | 162 | 77 | 286 | 88 | 222 |
| 0.3048 | 45 | 320 | 101 | 243 | 93 | 25 |
| 0.3302 | 49 | 135 | 106 | 27 | 104 | 0 |
| 0.3556 | 15 | 4 | 119 | 0 | 92 | 0 |

TABLE 2-continued

| | | | Cell Size Distribution | | | |
|---|---|---|---|---|---|---|
| Probe Size (cm) | JSP 822 | Venus 190 | Moldex 2200 Inner Shell | Moldex 2600 Outer Shell | Moldex 2200 Outer Shell | Molded Auxetic Mesh |
| 0.381 | 2 | 0 | 74 | 0 | 34 | 0 |
| 0.4064 | 0 | 0 | 62 | 0 | 32 | 0 |
| 0.4318 | 0 | 0 | 35 | 0 | 2 | 0 |
| 0.4572 | 0 | 0 | 28 | 0 | 1 | 0 |
| 0.4826 | 0 | 0 | 16 | 0 | 0 | 0 |
| 0.508 | 0 | 0 | 5 | 0 | 0 | 0 |
| 0.5334 | 0 | 0 | 0 | 0 | 0 | 0 |
| Standard Deviation | 0.0676 | 0.0444 | 0.0814 | 0.0510 | 0.0708 | 0.0234 |

The data shown in Table 2 reveals that the molded auxetic mesh has the narrowest distribution of cell size compared to known non-auxetic molded meshes. Analysis of the data for standard deviation shows that the inventive auxetic mesh has the smallest standard deviation of all six meshes measured. The reduction of cell size distribution in the auxetic mesh is a result of the deformation characteristics of an auxetic structure, which allows it to more readily conform to highly contoured shapes without gross deformation of the mesh, such as folding or drawing.

What is claimed is:

1. A method of making a filtering face-piece respirator, which method comprises:
   (a) molding an auxetic mesh into an intended configuration for use in a mask body;
   (b) supporting a filtering structure adjacent to the molded auxetic mesh; and
   (c) joining a harness to the mask body.

2. The method of claim 1, wherein the auxetic mesh has open spaces that are defined by polymeric strands, and wherein the mesh is molded into a cup shape.

3. The method of claim 1, wherein the auxetic mesh includes a multitude of open spaces that are defined polymeric strands and by first and second sides and third and fourth sides, wherein the first and second sides are linear and wherein the third and fourth sides are non-linear and include segments that are offset non-perpendicularly to the first and second sides.

4. The method of claim 3, wherein the offset segments reside at an angle α of about 20 to 80 degrees from the linear first and second sides.

5. The method of claim 4, wherein angle α is about 40 to 70 degrees.

6. The method of claim 1, wherein the auxetic mesh comprises a multitude of openings that have a size of 5 to 50 square millimeters and that are defined by polymeric strands.

7. The method of claim 6, wherein the openings have a size of 10 to 35 square millimeters.

8. The method of claim 6, wherein the auxetic mesh exhibits a Poisson ratio of less than −0.2.

9. The method of claim 8, wherein the auxetic mesh exhibits a Poisson ratio of less than −0.4.

10. The method of claim 9, wherein the auxetic mesh exhibits a Poisson ratio of less than −0.7.

11. The method of claim 10, wherein the auxetic mesh exhibits a Poisson ratio that is not further less than −2.2.

12. The method of claim 1, wherein the auxetic mesh has a thickness of about 0.6 to 0.85 millimeters and has openings that are defined by polymeric strands.

13. The method of claim 1, wherein the auxetic mesh comprises polymeric strands that have an average cross-sectional area of about 0.1 to 3.5 square millimeters.

14. The method of claim 1, wherein the auxetic mesh comprises strands that have an average cross-sectional area of about 1.5 to 2.6 square millimeters.

15. The method of claim 1, wherein the auxetic mesh comprises polymeric strands that comprise polypropylene.

16. The method of claim 15, wherein the auxetic mesh comprises a polymeric material that has a Young's modulus of about 0.3 to 1900 Mega Pascals.

17. The method of claim 16, wherein the auxetic mesh comprises a polymeric material that has a Young's modulus of about 2 to 250 Mega Pascals.

18. The method of claim 1, wherein the molded auxetic mesh has polymeric strands that define cell openings that exhibit a cell size distribution that has a standard deviation of less than 0.04.

19. The method of claim 18, wherein the molded auxetic mesh exhibits a cell size distribution that has a standard deviation of less than 0.03.

20. The method of claim 18, wherein the molded auxetic mesh exhibits a cell size distribution that has a standard deviation of less than 0.025.

* * * * *